(12) United States Patent
Garrec

(10) Patent No.: US 10,384,340 B2
(45) Date of Patent: Aug. 20, 2019

(54) PORTABLE DEVICE FOR AMPLIFYING AN AXIAL FORCE

(71) Applicant: COMMISSARIAT A L'ENERGIE ATOMIQUE ET AUX ENERGIES ALTERNATIVES, Paris (FR)

(72) Inventor: Philippe Garrec, Gif-sur-Yvette (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 253 days.

(21) Appl. No.: 15/531,819

(22) PCT Filed: Dec. 9, 2015

(86) PCT No.: PCT/EP2015/079161
§ 371 (c)(1),
(2) Date: May 31, 2017

(87) PCT Pub. No.: WO2016/107723
PCT Pub. Date: Jul. 7, 2016

(65) Prior Publication Data
US 2017/0312914 A1   Nov. 2, 2017

(30) Foreign Application Priority Data

Dec. 31, 2014   (FR) .................... 14 63477

(51) Int. Cl.
*B25J 9/00* (2006.01)
*B25J 1/00* (2006.01)
(Continued)

(52) U.S. Cl.
CPC ............... *B25J 9/0006* (2013.01); *B25J 1/00* (2013.01); *B25J 13/006* (2013.01); *B25J 13/02* (2013.01); *B25J 13/088* (2013.01); *E01C 19/44* (2013.01)

(58) Field of Classification Search
CPC ...... B25J 9/0006; B25J 13/088; B25J 13/006; B25J 13/02; B25J 1/00; E01C 19/44
See application file for complete search history.

(56) References Cited

U.S. PATENT DOCUMENTS

2004/0255471 A1* 12/2004 Black .................. A01G 3/053
30/296.1
2015/0119998 A1   4/2015 Garrec et al.
2016/0031076 A1* 2/2016 Garrett .................. A61H 1/024
248/550

FOREIGN PATENT DOCUMENTS

FR    2 991 224 A1    12/2013
WO   2012/149402 A2   11/2012
WO   2014/159608 A1   10/2014

OTHER PUBLICATIONS

International Search Report of PCT/EP2015/079161 dated Mar. 14, 2016.

* cited by examiner

*Primary Examiner* — Adam R Mott
(74) *Attorney, Agent, or Firm* — Sughrue Mion, PLLC

(57) ABSTRACT

The invention relates to a portable device (1) for amplifying an axial force applied to a tool, which includes: means (100) for linking the device to a user; means (2) for guiding the tool (4) it translation along a longitudinal axis (X); means for actuating the tool, including a drum (5) provided with a motor (6) and a rope (7) rigidly connected to the tool (4) and forming at least one turn (8) around the drum (5); and means for controlling the actuating means in order to apply a force to the tool in response to a force provided by the user via a control member. The means (100) for linking the device to the user and the means (2) for guiding the tool (4) in translation allow the tool (4) to rotate freely about the longitudinal axis (X) and about at least one axis (Z, Y)

(Continued)

extending in a plane (P) which is normal to the longitudinal axis (X).

13 Claims, 4 Drawing Sheets

(51) Int. Cl.
  *B25J 13/02* (2006.01)
  *B25J 13/00* (2006.01)
  *B25J 13/08* (2006.01)
  *E01C 19/44* (2006.01)

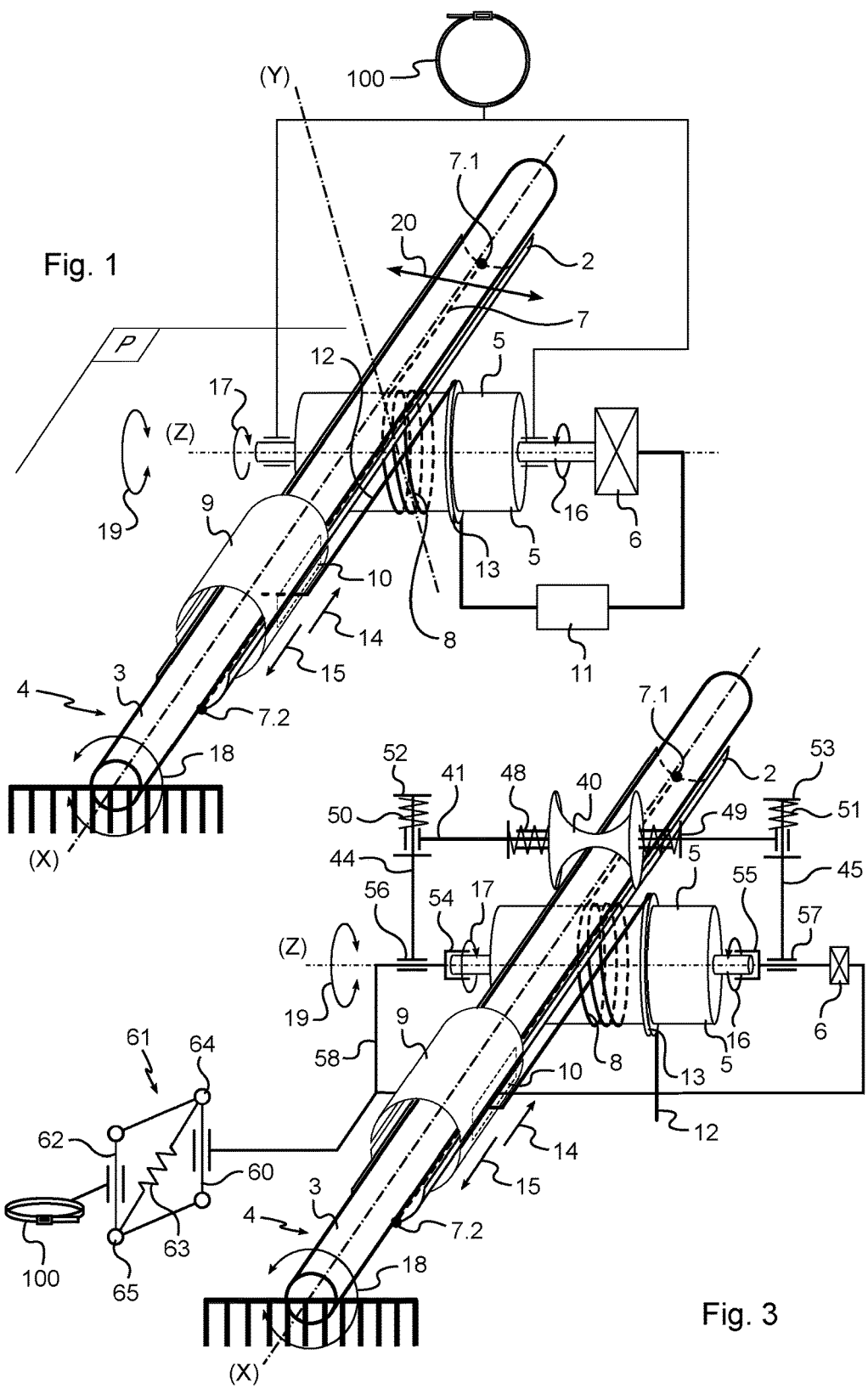

PORTABLE DEVICE FOR AMPLIFYING AN AXIAL FORCE

CROSS REFERENCE TO RELATED APPLICATIONS

This application is a National Stage of International Application No. PCT/EP2015/079161 filed Dec. 9, 2015, claiming priority based on French Patent Application No. 1463477 filed Dec. 31, 2014, the contents of all of which are incorporated herein by reference in their entirety.

FIELD OF THE INVENTION

The present invention relates to the field of force amplifiers, and more specifically to portable force amplifiers applied to operations on construction sites and/or civil engineering sites.

BACKGROUND TO THE INVENTION

Devices for amplifying force comprising a horizontal frame which is fixed to a wall of a building and which carries an arm extending in a vertical direction are already familiar. The lower extremity of the arm includes an interface for receiving a tool such as a drill, a screw-driver or a riveter. The user operates the device by actuating a control unit provided with a vertical force sensor. When the device for amplifying force detects a vertical control force on the sensor, it then controls an actuator (generally a jack) in such a way as to apply a vertical force to the tool that is proportional to the force applied to the control unit.

Also familiar from document WO2012/149402 is a device for amplifying a lifting force comprising a tracked platform supporting a lifting arm operated by a user. A suchlike device permits the easy amplification of a vertical force, but it is ill-adapted to the amplification of forces comprising a majority horizontal component.

The implementation of civil engineering works such as rafts, roads or even building slabs frequently requires a product (concrete, bitumen, etc.) to be "drawn" with the aid of a rake with the aim of leveling its surface. Such-like movements place demands on the back and the arms of the operators and are a source of numerous traumas and industrial accidents. The variable direction of the force (the inclination of the rake in relation to the ground changes as its movement progresses) does not allow the adaptation of the amplifiers of mono axial forces that are familiar to a suchlike application.

No device exists, therefore, which allows the force to be applied to a rake to be supplemented, at least partially, and which allows rapid movement of the user as the task of raking proceeds. Finally, the entirety of the known force amplifiers contain delicate mechanisms (control unit, actuators) which are not adapted to the particularly challenging conditions encountered when working on a construction site.

OBJECT OF THE INVENTION

The invention has as its aim to reduce the forces to be provided by an operator during on-site raking operations while maintaining the satisfactory mobility of the operator in the course of these operations.

SUMMARY OF THE INVENTION

For this purpose, a portable device is proposed for amplifying an axial force applied to a tool, comprising:

- means for linking the device to a user;
- means for guiding the tool in translation along a longitudinal axis;
- means for actuating the tool along the longitudinal axis comprising a drum provided with a motor and a rope rigidly connected to the tool and forming at least one turn around the drum;
- means for controlling the actuating means for applying an assistance force to the tool in response to an actuating force provided by the user via a control unit;

wherein the means for linking to the user and the means for guiding the tool in translation allow the tool to rotate freely about the longitudinal axis and about at least one axis extending in a plane which is normal to the longitudinal axis.

Thus, the device makes it possible to assist the operation of a tool such as a rake, both when being pulled and when being pushed, while maintaining the degrees of freedom necessary for the accomplishment of the raking tasks. The motorization with the aid of a drum driving a rope is robust, simple, light and economical, while at the same time guaranteeing a reliable transmission of force.

The invention also applies to a lower exoskeleton provided with a device for the amplification of force according to the invention.

Other characterizing features and advantages of the invention will be appreciated from a perusal of the following description of particular non-restrictive embodiments of the invention.

BRIEF DESCRIPTION OF THE DRAWINGS

Reference is now made to the accompanying figures, in which:

FIG. 1 is a schematic representation in a perspective view of a first embodiment of an amplifying device according to the invention;

FIG. 3 is a partial schematic representation in a perspective view of a second embodiment of the invention;

DETAILED DESCRIPTION OF THE INVENTION

Figure 2:
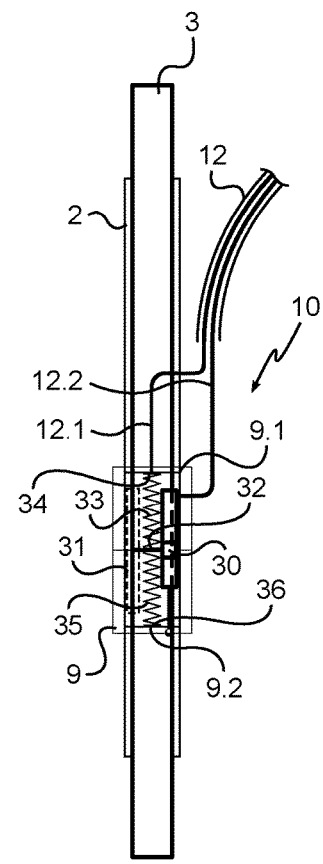
FIG. 2 is a detailed schematic view of a force sensor of the amplifying device in FIG. 1.

With reference to FIGS. 1 and 2, the amplifier device, generally designated as 1, is mounted on a belt 100 intended to be worn by the user and comprises:

- a semi-cylindrical gutter 2 for guiding the handle 3 of a rake 4 in translation along a longitudinal axis X;
- a drum 5 driven in rotation by a motor 6 about an axis Z, in this case horizontal;
- a rope 7 making three turns 8 around the drum 5 and of which the two extremities 7.1 and 7.2 are connected to the handle 3 of the rake 4;
- a cylindrical control sleeve 9 extending around the gutter 2 and the handle 3 which rests thereon.

The sleeve 9 is connected to a force sensor 10 measuring the longitudinal force applied along the axis X to the sleeve 9. The force sensor 10 transmits to a processing unit 11 an electrical signal that is proportional to the measured force and to its direction via a rope 12 wound around an idler pulley 13 mounted on the drum 5. As can be seen in FIG. 1, the longitudinal axis X extends substantially perpendicularly to the axis Z of rotation of the drum 5.

The force of assistance in translation of the handle 3 of the rake 4 along the axis X may thus be controlled by the application of a torque to the motor 6 triggered by a displacement of the control sleeve 9. The displacement of the control sleeve 9 being proportional to the control force exerted axially thereon, the assistance force exerted on the handle 3 of the rake 4 is thus dependent on the control force. Depending on whether the sleeve 9 is pulled from the extremity of the tool towards the drum (arrow 14 in FIG. 1) or whether the sleeve 9 is pushed (arrow 15 in FIG. 1), the force of the motor on the rake 4 is a push (rotation of the drum 5 in the direction 16) or a pull (rotation of the drum 5 in the direction 17).

The rake 4 remains easy to operate because the following degrees of freedom are left free within amplitudes that are compatible with the tasks to be performed, being substantially equal to [−45°; +45°]:
- rotation of the rake 4 about the longitudinal axis X (represented by the arrow 18 in FIG. 1);
- rotation of the gutter 2 and thus of the rake 4 about the axis Z of rotation of the drum 5 (represented by the arrow 19 in FIG. 1);
- rotation of the gutter 2 and thus of the rake 4 about an axis Y perpendicular to a plane P tangent to the drum 5 at its point of contact with the gutter 2 (represented by the arrow 20 in FIG. 1).

The axes Y and Z are perpendicular to one another and extend in a plane which is normal to the longitudinal axis X.

The gutter 2 may be coated advantageously with a coating made of Teflon facilitating the sliding of the handle 3 of the rake 4.

In operation, the user puts on the belt 100 in such a way that the drum 5 is situated in proximity to one of his hips. The user grasps the sleeve 9 with one hand, and the other hand may or may not grasp the gutter 2. The hand holding the sleeve 9 as well as the other hand, as the need arises, exerts guiding forces in the plane which is normal to the axis X. When he wishes to move the rake 4 along the longitudinal axis X, the user exerts a control order in the form of a force 21 applied to the sleeve 9. The processing unit 11 detects the direction and the intensity of the control force 21 applied to the sleeve 9 and then controls the motor 6 in order to apply a working torque 22 to the drum 5. The direction and the intensity of the working torque 22 are dependent on the direction and the intensity of the force 21 exerted on the sleeve 9. The operator remains in control of the position of the rake 4 along the axis X, as in all the other directions, since the drum exerts a sliding force although it is not subject to a position or a given trajectory.

With reference to FIG. 2, one particular embodiment of the force sensor 10 is now described in detail. The sensor 10 comprises a parallelepipedic index 30 that is integral with the sleeve 9 and is slidably mounted in relation to the gutter 2. The index 30 slides on a resistive track 31 that is rigidly connected to the gutter 2, and of which one extremity is connected to a first strand 12.1 of the rope 12. A second strand 12.2 of the rope 12 is connected to a stylus 32 that is rigidly connected to the index 30, and of which one extremity comes into contact with the track 31. The index 30 is connected by a first spring 33 to a point 34 on the gutter 2 situated in proximity to a first extremity 9.1 of the sleeve 9. The index 30 is also connected by a second spring 35 to a second point 36 on the gutter 2 situated in proximity to a second extremity 9.2 of the sleeve 9.

When the user pulls or pushes on the sleeve 9, he causes the length of the resistive track 31 extending between the stylus 32 connected to the rope 12.1 and the extremity of the resistive track 31 connected to the strand 12.1 to vary. The resistance measured between the strands 12.1 and 12.2 makes it easy to determine the value and the direction of displacement of the sleeve 9. The respective rigidities $K_{33}$ and $K_{35}$ of the springs 33 and 35 thus permit the intensity of the force exerted on the sleeve 9 to be deduced. This force sensor 10 has proven to be particularly robust and not at all sensitive to the conditions of humidity, dust and impacts that are encountered on construction sites.

Figure 4:
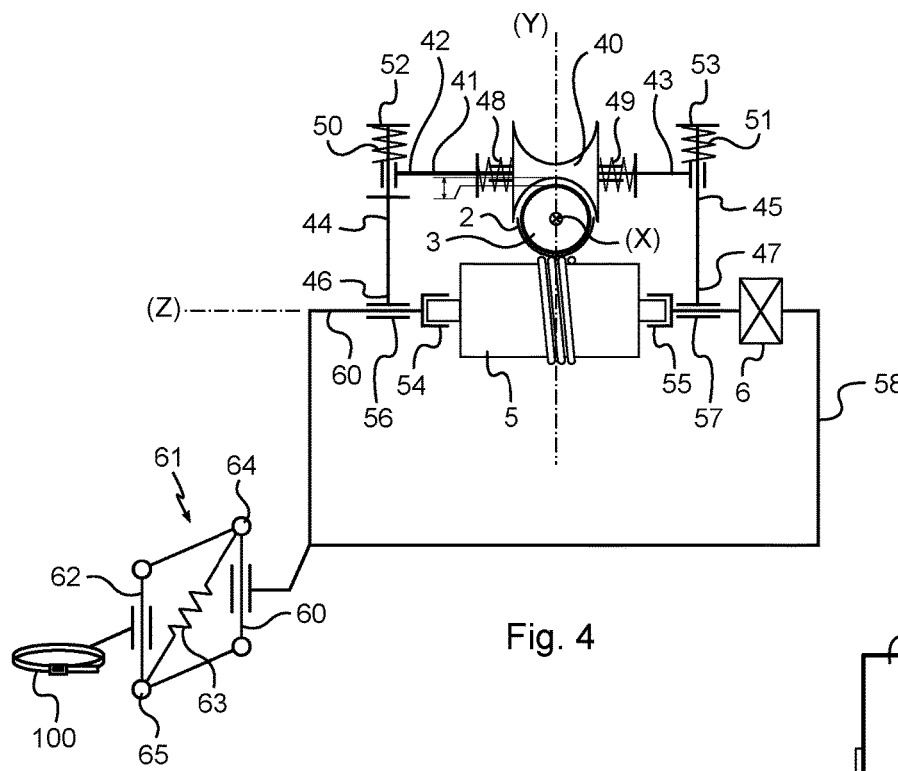
FIG. 4 is a schematic plan view of the device in FIG. 3.

A second particular embodiment of the invention will now be described with reference to FIGS. 3 and 4. In this embodiment, the handle 3 of the rake 4 is maintained in the gutter 2 by a dolly 40. As can be seen in FIG. 4, the dolly 40 is rotatably mounted on a shaft 41 parallel to the axis of rotation Z of the drum 5. The shaft 41 is slidably mounted at its two extremities 42 and 43 respectively on two rods 44 and 45. The respective extremities 46 and 47 of the rods 44 and 45 are rotatably mounted about the axis Z of rotation of the drum 5 on bearings 56 and 57. The shaft 41 comprises two abutments, bearing against which are springs 48 and 49 to return the dolly 40 towards a central position. These springs 48 and 49 also allow a translation of the dolly 40 in the direction of the axis Z, in particular in order to assist the winding and the unwinding of the turns 8 on the drum 5. Springs 50 and 51 respectively bearing against the extremities 52 and 53 of the rods 44 and 45 opposite the extremities 46 and 47 maintain the dolly 40 in contact with the handle 3. The bearings 54 and 55 of the drum 5 as well as the bearings 56 and 57 of the rods 44 and 45 are integral with a support 58 that is rotatably mounted about a substantially vertical side 60 of a spring-assisted deformable balancing parallelogram 61. The side 62 of the parallelogram 61 parallel to the side 60 is rotatably mounted about a substantially vertical axis that is rigidly connected to the belt 100. The balancing of the parallelogram 61 is achieved with the aid of a spring 63 extending between two opposite corners 64 and 65 of the parallelogram 61.

When he puts on the belt 100, the user is freely able to adjust the height of the amplifier device 1, while maintaining the following degrees of freedom:
- rotation of the handle 3 of the rake 4 about the longitudinal axis X;
- rotation of the gutter 2 and thus the rake 4 about the axis Z of rotation of the drum 5;
- rotation of the structure 58 about the vertical side 60 of the parallelogram 61.

Figure 6:
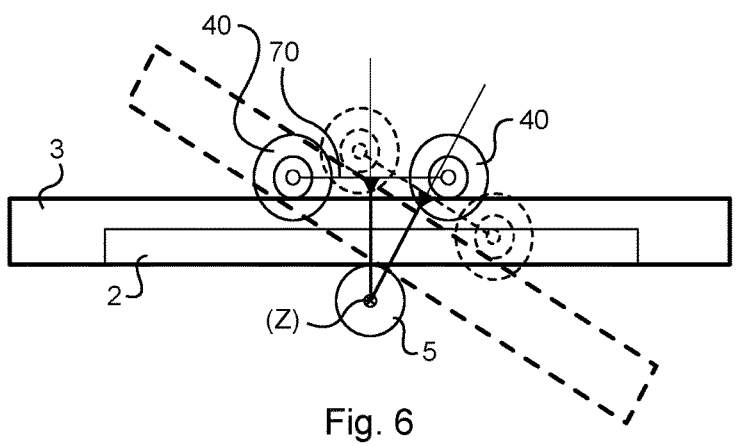
FIG. 6 is a detailed view of the device in FIG. 5.
Figure 5:
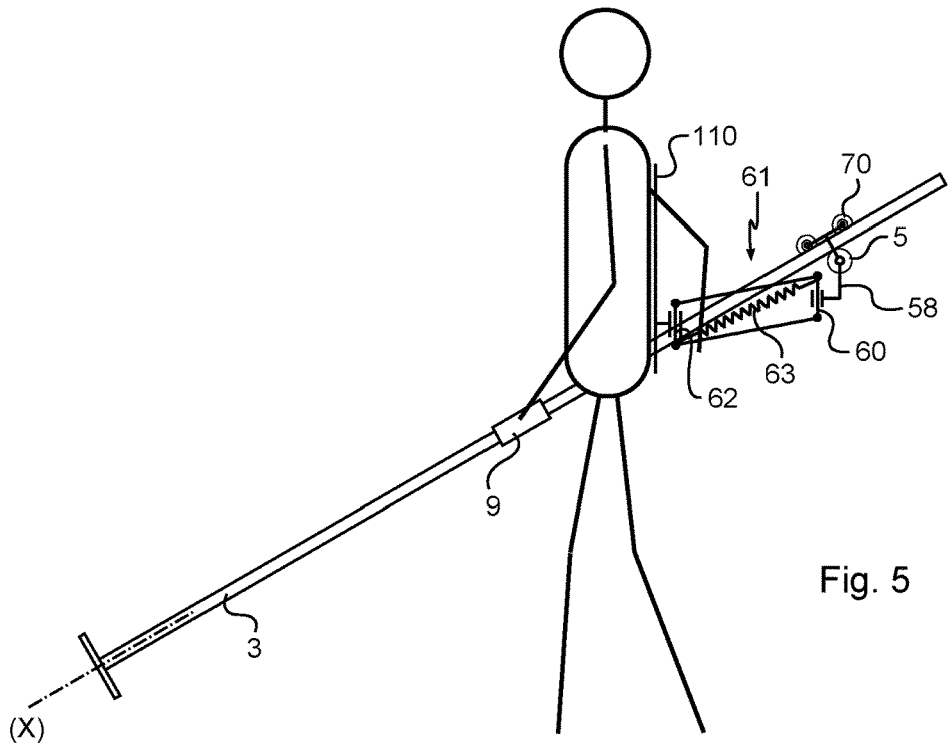
FIG. 5 is a schematic representation in plan view of a third embodiment of the amplifying device according to the invention.
Figure 7:
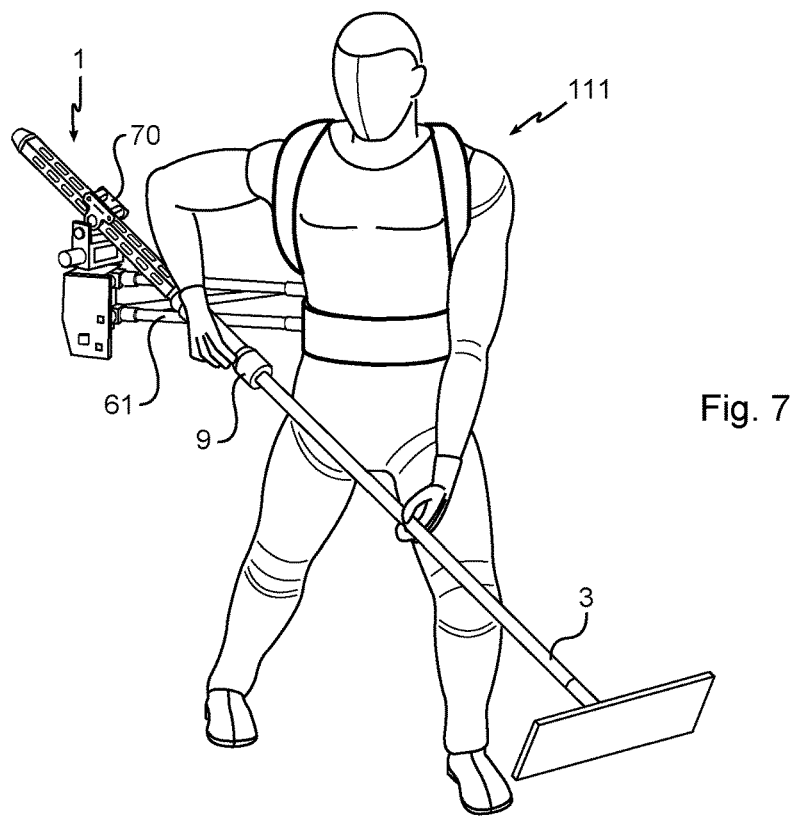
FIG. 7 is a schematic representation in a perspective view of the device in FIG. 5.

FIGS. 5 to 7 represent an embodiment in which the dolly 40 is replaced by a bogie 70 comprising two dollies 40, thereby ensuring improved guiding of the handle 3 in the gutter 2. In this embodiment, the side 62 of the parallelogram 61 is rotatably mounted about a substantially vertical axis that is integral with a backing plate 110 of a harness 111. The use of the harness 111 permits better distribution of the forces on the user, more particularly the vertical forces and the torques.

Figure 8:
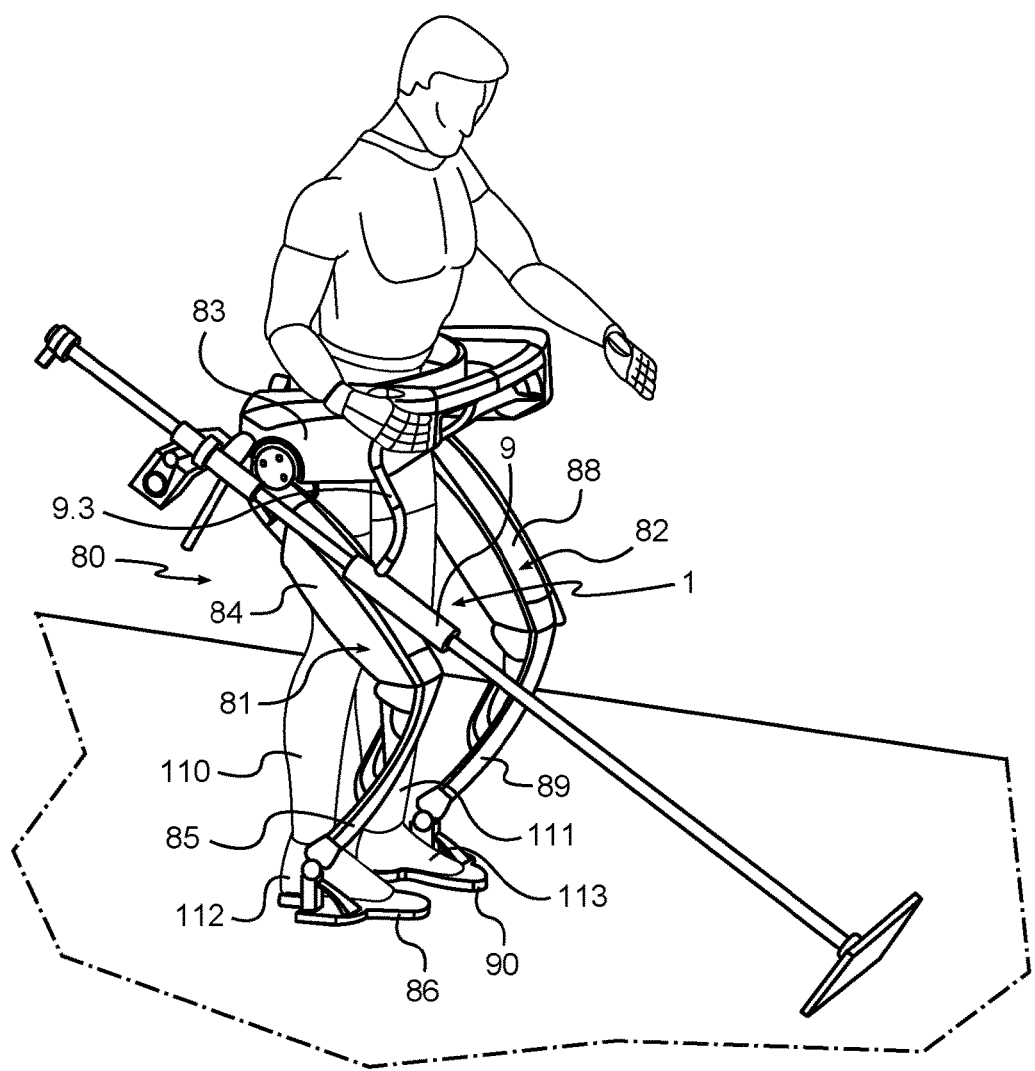
FIG. 8 is a schematic representation in a perspective view of a fourth embodiment of the invention.

With reference to FIG. 8, the amplifying device 1 is integrated into a lower exoskeleton 80. The lower exoskeleton 80 comprises two lower members 81 and 82 extending respectively in a plane parallel to the right leg 110 and a plane parallel to the left leg 111 of the user. The lower member 81 is articulated on a segment of hip 83 and comprises a segment of thigh 84 articulated on a segment of tibia 85, at the extremity of which is articulated a foot 86 on which the foot 112 of the user is fixed. The articulations between the segments of hip 83, the segment of thigh 84 and the segment of tibia 85 are motorized and controlled by a processing unit 87 of the lower exoskeleton 80. The lower segment 82 comprises in a homologous manner a segment of thigh 88 articulated on the one hand on the segment of hip 83 and on the other hand on a segment of tibia 89, at the extremity of which is articulated a foot 90 on which the foot 113 of the user is fixed. In the embodiment represented in FIG. 6, the sleeve 9 receives a handle 9.3 permitting the user not to have to bend over in order to actuate the sleeve 9.

The processing unit 87 controls the motorizations of the articulations of the lower exoskeleton 80 depending on the movements of the legs 110 and 111 of the user and on the information received by the processing unit 11 of the amplifying device 1. The processing unit 87 is thus able to arrange the blocking—or the application of balancing forces calculated by the processing unit 87—of a single lower member or the two lower members 81 and 82 during actuation of the rake 3 in order to relieve the stresses on the legs and the back of the user.

The expression rope is used here to designate a flexible component of solid or tubular section having a circular, flat or other form, with the ability to be made up of sub-elements that are articulated with one another, for example a chain or a belt.

Of course, the invention is not limited to the embodiments described above, but encompasses any variant falling within the scope of the invention as defined by the claims.

In particular, although the amplifying device is mounted on a belt or a harness comprising a backing plate in this case, the invention is applicable to other means for linking to a user, for example a harness lacking a backing plate, braces or possibly a second handle rigidly connected to the trough;

although the rake is guided in translation by a semi-cylindrical trough in this case, the invention also applies to other means for guiding in translation, for example a plurality of coaxial sliding bushes, one or a plurality of pins in a slide or a trough of triangular or some other form;

although the translation of the handle of the rake relative to the trough is assured by friction on a coating having a low coefficient of friction in this case, the invention also applies to other means of sliding, for example pulleys or rollers, that are integral with one or the other of the handle and the trough;

although the device has been described in relation to the actuation of a rake in this case, the invention also applies to other types of tools, for example a scraper, a roller or a float;

although the axis of driving of the drum is horizontal in this case, the invention also applies to actuating means comprising a drum of which the axis is oriented differently, for example an axis that is vertical or oriented in any direction;

although the rope makes three turns around the drum in this case, the invention also applies to a different number of turns, for example a single turn, two turns or more than three turns;

although the control of the actuating means is exerted by the user on a sleeve in this case, the invention also applies to other types of means of control, for example a handle, a rotary knob or a joystick;

although the sensor of force is of the resistive type in this case, the invention also applies to other means for the detection and/or measurement of a force applied to a control, for example a deformation gauge, an optical sensor facing towards a segmented track, a rope connected to an incremental rotary encoder. The sensor may transmit the information either by wire or wirelessly, for example according to a Wi-Fi or Bluetooth protocol;

although the index of the force sensor is moved back into position with the aid of springs in this case, the invention also applies to other types of elastic means, for example elastomer blocks, Belleville washers, one or a plurality of gas springs;

although the control of the motorization of the drum is performed by a processing unit in this case, the invention also applies to other means for control, for example a three-way hydraulic or pneumatic valve or an electric speed variator.

The invention claimed is:

1. A portable device for amplifying an axial force applied to a tool comprising:
    means for linking the device to a user;
    means for guiding the tool in translation along a longitudinal axis;
    means for actuating the tool along the longitudinal axis comprising a drum provided with a motor and a rope rigidly connected to the tool and forming at least one turn around the drum;
    means for controlling the actuating means for applying an assistance force to the tool in response to an actuating force provided by the user via a control unit;
    wherein the means for linking to the user and the means for guiding the tool in translation allow the tool to rotate freely about the longitudinal axis and about at least one axis extending in a plane which is normal to the longitudinal axis.

2. The device as claimed in claim 1, in the control unit is provided with means for measuring a longitudinal force.

3. The device as claimed in claim 1, wherein the means for linking the device to the user and the means for guiding in translation allow the tool to rotate freely about two perpendicular axes extending in a plane which is normal to the longitudinal axis.

4. The device as claimed in claim 1, wherein one of the axes of free rotation of the tool is substantially vertical.

5. The device as claimed in claim 1, wherein the control unit comprises a sensor for the displacement of an index that is moved back into position by at least one elastic element.

6. The device as claimed in claim 1, wherein the control unit is connected to the means of control by a wireless link.

7. The device as claimed in claim 1, wherein the means for guiding the tool in translation comprise at least one dolly.

8. The device as claimed in claim 1, wherein at least one extremity of the rope is connected to the tool.

9. The device as claimed in claim 1, wherein the means for linking to the user comprising means for adapting the height of the tool.

10. The device as claimed in claim 9, wherein the means for linking to the user comprise a balancing parallelogram.

11. The device as claimed in claim 1, further comprising an integrated lower exoskeleton.

12. The device as claimed in claim 11, wherein the lower exoskeleton comprises at least one articulated lower member and wherein a processing unit is so arranged as to be capable of controlling the blocking of at least one articulation of the lower member.

13. The device as claimed in claim 11, wherein the lower exoskeleton comprises at least one articulated lower member and wherein a processing unit is so arranged as to be capable of controlling the application of a balancing torque to an articulation of the lower member.

\* \* \* \* \*